Feb. 15, 1938.  A. PERON  2,108,409
MANUFACTURE OF COOKING UTENSILS
Filed March 18, 1936   2 Sheets-Sheet 1
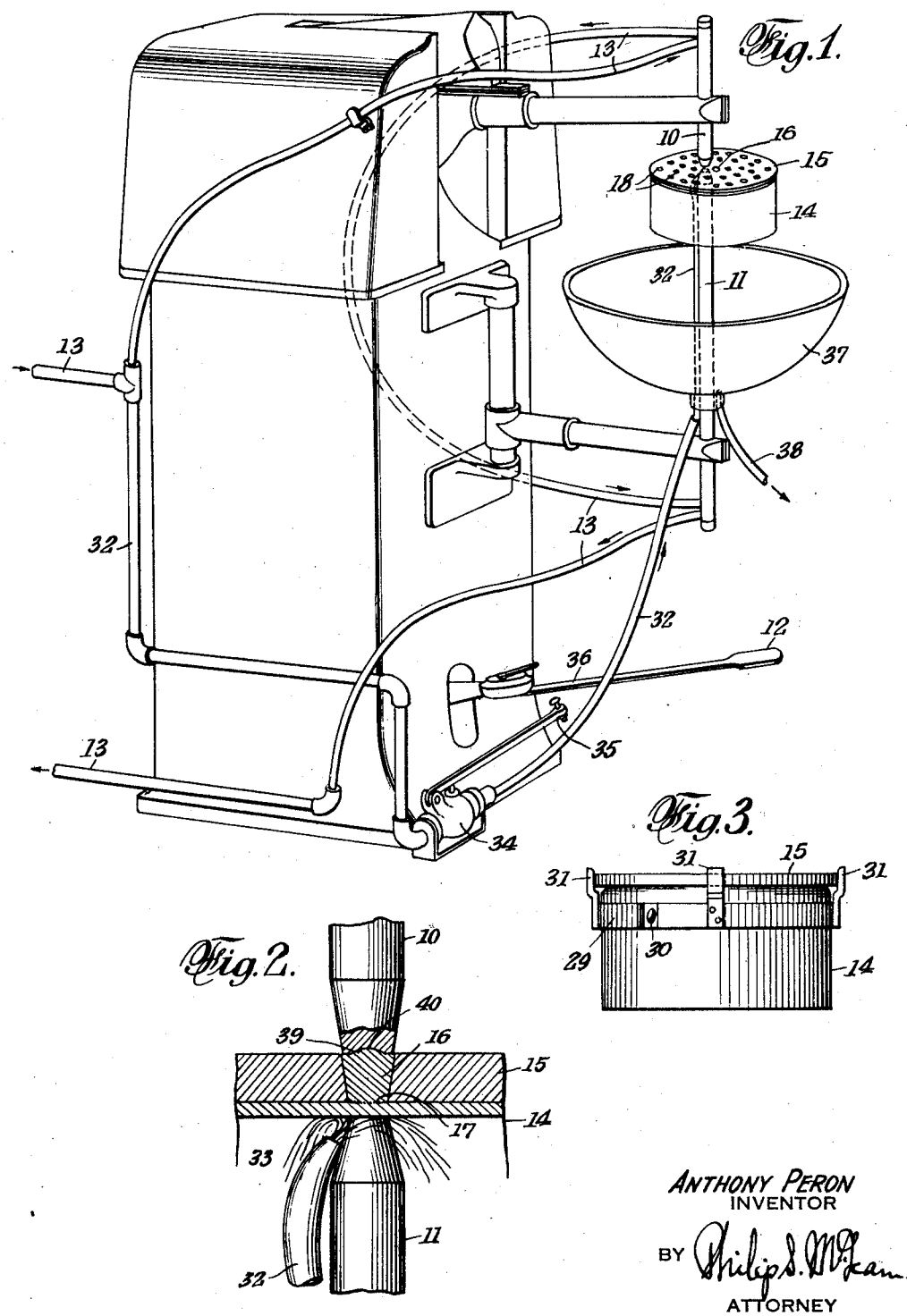
ANTHONY PERON
INVENTOR
BY *Philip S. McLean*
ATTORNEY Feb. 15, 1938.  A. PERON  2,108,409
MANUFACTURE OF COOKING UTENSILS
Filed March 18, 1936   2 Sheets-Sheet 2
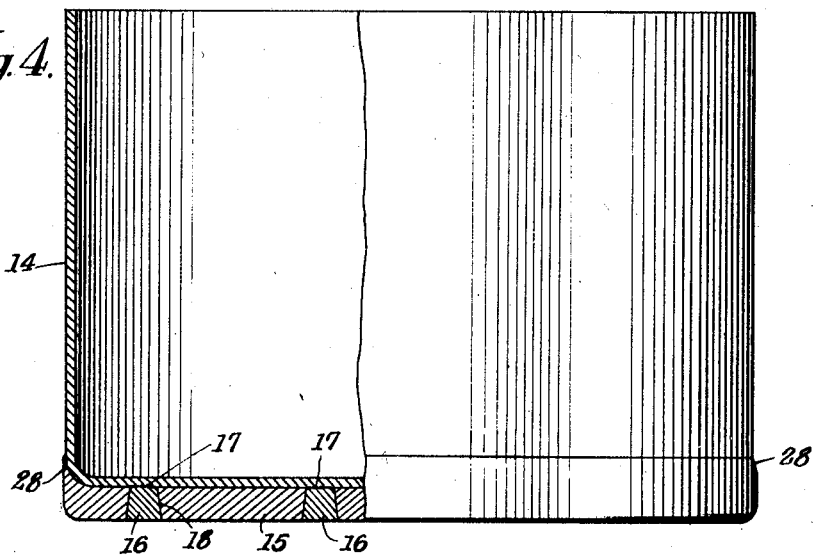
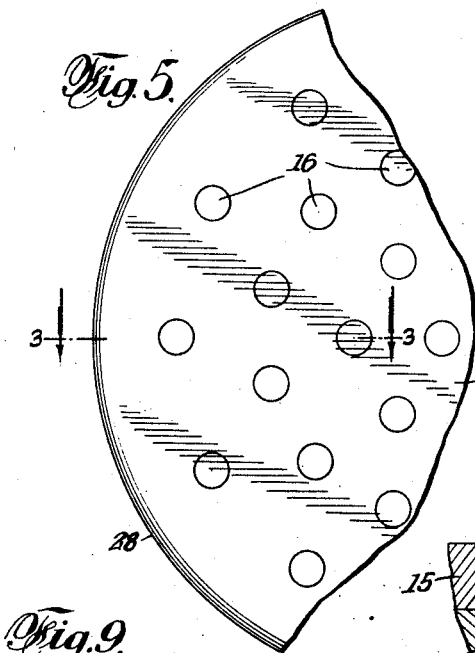
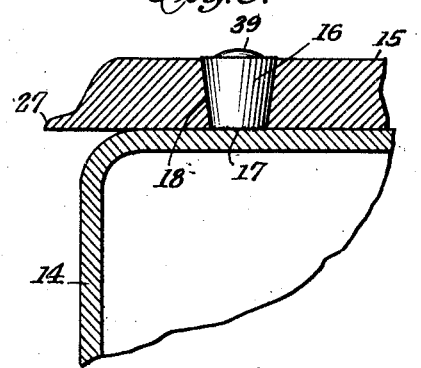
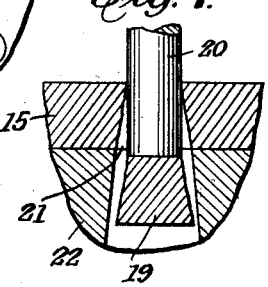
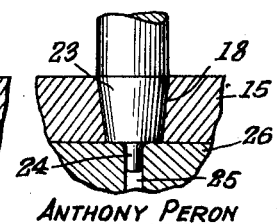
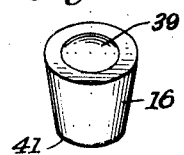
ANTHONY PERON
INVENTOR
BY *Philip S. McTan.*
ATTORNEY Patented Feb. 15, 1938

2,108,409

UNITED STATES PATENT OFFICE 2,108,409

MANUFACTURE OF COOKING UTENSILS

Anthony Peron, New York, N. Y.

Application March 18, 1936, Serial No. 69,424

8 Claims. (Cl. 113—120)

This invention relates to the manufacture of pots and cooking utensils of the type covered in the Peron Patent No. 2,040,102 of May 12, 1936, in which heat collecting plates are secured to the bottoms of the pots by special welded studs.

The objects of the invention are to provide for the commercial manufacture of such utensils and particularly to enable such articles to be constructed rapidly, economically and efficiently and in the end to provide an article well suited for the purposes intended.

These general objects and other more specific objects, together with details of construction, combinations, relations of parts and modes of operation constituting the invention, will appear or are set forth in the following specification and broadly covered in the claims.

The drawings accompanying and forming part of the specification illustrate certain structural features and methods of manufacture embodying the invention, but these it will be understood are subject to change, within the true spirit and broad scope of the invention.

Fig. 1 is a broken perspective view of a spot welding machine especially designed and modified for manufacture of the pots and showing it in the act of making one of the welds.

Fig. 2 is an enlarged broken sectional detail view illustrating the special feature of the cooling spray automatically effected immediately at the completion of the weld.

Fig. 3 is a side elevation showing the frame for holding the plate centered on the bottom of the pot prior to the first weld.

Fig. 4 is a broken part sectional detail view of the completed article, the sectional portion appearing as on line 4—4 of Fig. 5.

Fig. 5 is a partial bottom plan view of the pot.

Fig. 6 is a broken sectional detail showing the collector plate trimmed and ready to have the edge spun or lapped against the curved rim portion of the bottom.

Fig. 7 is a broken sectional detail illustrating the action of the punch in striking out tapered openings in the plate.

Fig. 8 is a similar view showing the action of the finishing punch in smoothing these tapered openings.

Fig. 9 is a perspective view of one of the welding rivets or studs.

A spot welder of suitable design for carrying out the method of this invention is shown in Fig. 1 as consisting of opposed, or upper and lower electrodes 10, 11, adapted to be brought together at opposite sides of the work by means of a foot pedal 12. These electrodes are indicated as cooled by a circulation of water afforded by piping 13.

The pot or other utensil is indicated at 14, between the two electrodes and having applied to the bottom of the same the heat collecting plate 15.

As described particularly in the patent referred to, the pot is of stainless steel, such as Allegheny metal, crucible steel, Resistol K2, or other non-rusting or non-corrosive material, including such as nickel, Monel metal or the like. The heat collecting plate is of hard cold rolled copper or the like, and the two are permanently and in effect, "integrally" secured together by tapered studs 16, welded at their smaller ends to the bottom of the pot.

Details of this construction are shown in Fig. 4. ..The studs 16 are of the same or substantially the same material as the pot, so that the inner smaller ends of the same will form a permanent unitary weld at 17. The taper of the studs and of the seats 18 provided for them in the plate is substantially the same and the fit of these parts is such that with the welding pressure the studs will completely fill these openings and bind the plate to the pot bottom.

The present, preferred method of forming these tapered seats, consists in first punching out the tapered plugs 19, Fig. 7, as by means of a roughing out punch 20, cooperating with an over-size passage 21, in the die block 22. This punch combination has the effect of first cutting and then tearing out a plug, increasing in diameter from that of the punch 20, to the size of the die opening 21. The rough tapered opening thus produced in the plate is then smooth finished by a finishing punch such as indicated at 23, in Fig. 8, tapered to the desired final taper of the seat or opening 18. This finishing punch is shown as having a pilot projection 24, entering a guide opening 25, in the base or die bed 26.

The seats for the welding lugs or studs are thus accurately formed to the desired smooth finish and taper without producing any cuttings or loose particles which might interfere with the accurate fit of the studs in the seats or the smooth continuous engagement between the face of the plate and the bottom of the pot.

Fig. 6 illustrates the two factors last mentioned, that is, the exact fit of the tapered stud 16, in the tapered seat 18, and the smooth continuous engagement of the plate with the bottom of the pot. This view also illustrates how, when desired, the plate may be made slightly larger in diameter than the pot bottom and, after it is secured in place, be turned down to form a tapered projecting flange 27, which afterward may be "spun" or "lapped" closely about the curved rim at the bottom of the pot to a thin edge 28, Fig. 4, closing and sealing the joint between the pot and bottom plate. In this view and in Fig. 5, the sealing flange 28 is produced from a slightly larger diameter of plate, so that in the finished construction, this heavier plate projects slightly beyond the pot wall and thus forms a protective buffer for the side wall of the pot.

For centering and holding the plate on the pot bottom preparatory to welding operations, a frame such as indicated in Fig. 3 may be employed, the same consisting of a split ring 29, secured in centered engagement about the pot body by screw 30, and having projecting offset lugs 31, engaging the rim of the plate to temporarily hold the same in centered position. After the first weld is made, which usually would be at the center of the pot, this temporary guide or frame may be removed, as in Fig. 1, and the rest of the welds completed with this frame out of the way. The strength of this one weld is sufficient to hold the plate firmly and securely in position in readiness for the second and succeeding welds.

The electrodes are usually water cooled as illustrated in Fig. 1 and first described above. Additional cooling has been found desirable to prevent over-heating and discoloration and to effect a quick shrinkage, which will make the stud bind the plate to the pot bottom. This is accomplished in the illustration by running a water connection 32, up alongside the lower electrode, terminating in a nozzle 33, Fig. 2, for directing a spray of chilling water at the pan bottom immediately adjacent the lower electrode. A valve 34 is located in this water line, shown in Fig. 1, as provided with an actuating lever 35, in position to be engaged by a trip portion 36, on the foot pedal 12. Pressure on the foot pedal brings the top electrode down, closing the circuit and forcing the stud or rivet firmly down in its tapered seat and into welding engagement with the pot bottom. Slight additional pressure on the pedal then operates a switch to cut off the current and in this additional movement the portion 36 of the pedal trips the valve lever 35, to start the spray of cooling water against the bottom of the pot and the tip of the lower electrode. The welding action is almost instantaneous and the cooling spray comes on instantly the weld is completed, so discoloration or overheating of the pot bottom is avoided. The switch which cuts the current on in the downward movement of the pedal and then opens the circuit with a slight additional movement, is a special make-and-break switch commonly used in this type of spot welding and for which reasons, details of same are not shown.

The drain from the weld cooling operation is shown as collected in a bowl 37, surrounding the lower electrode and having a suitable outlet 38.

The welding studs are made of the same or similar metal as the pot, so that they will unite integrally therewith and they are shown in Figs. 2 and 6, as initially formed with a rounded projection or head 39, on the large end to match a corresponding recess or socket 40, in the end of the upper electrode to effect a cooperative centering action and to assure good current conductivity between the two. After the plate is secured, these projections 39 may be removed as by grinding and in this same grinding operation, or as a continuation of the same, the bottom face of the plate may be made entirely flat and smooth. Also the inside surface of the pot bottom is preferably ground down perfectly flat. This smoothing operation removes any "blue" spots which may appear on the inner surface of the pot from the welding operations. The weld is made so quickly and the spurt of water cools the weld so fast that practically no expansion of the pot or bottom plate can take place. The weld is cooled immediately from the red hot condition. The surface spots which may appear at the inside are easily removed in the grinding or surfacing operation. The bottom plate also is thick and heavy enough to hold the stainless steel or other metal of the pot against buckling tendency either at the time of making the welds or later.

The tapered studs, because of their exact fit in the tapered seats, hold the bottom plate as a substantially integral part of the bottom of the pot regardless of wear, these rivets or studs actually holding the plate down to the last $\tfrac{1}{64}$ of an inch in thickness. This bottom plate forms in effect a firm foundation for the pot and is so tightly secured that no moisture or other foreign matter can enter between the pot bottom and plate, this being true even though the edge of the plate is not spun in against the pot bottom as in Fig. 4, but terminates inward of the full diameter of the pot as illustrated in the Peron patent above identified.

The taper of the welding studs may vary. For a $\tfrac{1}{4}$ inch thickness of plate, the studs would have a finished length of $\tfrac{1}{4}$ inch and the small end might be $\tfrac{1}{4}$ inch in diameter with the larger end $\tfrac{5}{16}$ inch in diameter. These proportions of diameter of the smaller end equal to the finished length may generally be followed, but for plates as thin as $\tfrac{1}{8}$ of an inch or less, the taper of the studs may be greater. The inner edges of the rivets may be slightly relieved as indicated at 41, Fig. 9, so as to leave no sharp corners which might cut or scrape the copper when being forced home against the pot bottom and so as to enable the metal to "flow" sufficiently at the welding surface.

For testing the welds, a small amount of water may be placed in the pot. As this water is sufficiently heated, bubbles will rise in a steady column from each spot where a perfect weld is located indicating the existence of perfect heat conduction. Any imperfect welds will show up by the lack of such a bubble column. This therefore provides a simple method by which the manufacturer may determine that the job is a perfect one or on the other hand, that certain welds must be replaced.

While the spinning of a thin flange of the collector plate against the bottom of pot provides a more finished appearance and has certain other advantages, this construction is more expensive and therefore from the cost standpoint, it may be preferred to omit this feature, substantially as in the Peron patent.

This simpler form of construction has advantages of being lighter and requiring less labor, as well as actually less expensive in materials than the form with the inwardly spun sealing flange.

The operations and structure may possibly be modified in other ways and the claims and terms employed are to be construed accordingly.

Instead of a spot welder of the foot operated type such as illustrated, motor actuated machines with automatic timing may be employed to advantage. The bowl 37, for catching the weld cooling water may be of wood or other non-magnetic insulating material. Because of its necessary size, the non-magnetic character of this bowl is particularly important as a magnetic element of such size would materially interfere with the proper use of the machine. The Allegheny metal of the pot is practically non-magnetic and so offers no difficulties in handling of the machine. This can be a relatively thin walled vessel, relying on the strength of the flat cold rolled copper collector plate for holding it in shape.

What is claimed is:

1. The method of manufacturing utensils of the character disclosed, comprising rough punching tapered openings in a heat collector plate, smooth punching said openings to exact tapered size, applying the plate to a pot bottom with the smaller ends of the openings toward the pot, entering tapered studs of substantially the same size in said tapered openings, spot welding the smaller ends of said tapered studs to the pot bottom, chilling the welds to prevent over-heating and distortion of the pot bottom, finishing off the exposed ends of the welded studs flush with the exposed face of the collector plate and finishing the interior of the pot bottom to remove any color traces of the welding heat.

2. The method of manufacturing utensils of the character disclosed, comprising rough punching tapered openings in a heat collector plate, smooth punching said openings to exact tapered size, applying the plate to a pot bottom with the smaller ends of the openings toward the pot, entering tapered studs of substantially the same size in said tapered openings, spot welding the smaller ends of said tapered studs to the pot bottom, chilling the welds to prevent over-heating and distortion of the pot bottom, finishing off the exposed ends of the welded studs flush with the exposed face of the collector plate and finishing the interior of the pot bottom to remove any color traces of the welding heat, turning the edge of the plate to a reduced flange and then spinning said flange into closed sealed engagement with the bottom and adjoining side portion of the pot.

3. The method of manufacturing utensils of the character disclosed, comprising forming tapered openings in a heat collector plate, applying the same to a pot bottom with the smaller ends of the tapered openings toward the pot bottom, inserting into said tapered openings, studs of the same material as the pot bottom and of substantially the same tapered shape as the openings and welding said similarly tapered studs in said openings to said pot bottom, turning an edge flange on said secured collector plate and then spinning said flange into close sealed engagement with the adjoining side surface of the pot bottom.

4. The method of manufacturing utensils of the character disclosed, comprising rough punching tapered openings in a heat collector plate, finish punching said openings to an exact taper shape, applying said plate to a pot bottom with the smaller ends of said openings toward the pot bottom, inserting into said openings, plugs of substantially the same taper and of the same material as the pot bottoms and welding said taper plugs of similar shape through said openings to the pot bottom.

5. The method of manufacturing utensils of the character disclosed, comprising operating a punch of one size through a die opening of larger size to punch and tear openings in an interposed collector plate increasing in size from the punch diameter to that of the companion die opening, then smooth punching said tapered openings, applying the plate to a pot bottom with the smaller ends of the openings toward the pot bottom, inserting into said openings tapered studs of substantially the same size as said tapered openings and welding said tapered plugs through said openings to the pot bottom.

6. The method of manufacturing utensils of the character disclosed, comprising forcing tapered plugs through tapered openings of substantially the same size in a collector plate into engagement with a pot bottom and in so doing, applying a welding current through said tapered plugs to thereby fuse the smaller ends of the latter to the pot bottom and immediately following completion of the weld applying a cooling medium to the inside face of the pot bottom opposite the weld.

7. The method of manufacturing utensils of the character disclosed, comprising securing a relatively heavy heat collector plate to the bottom of a pot, turning a thin flange on the rim of the secured collector plate and then spinning said flange into closed permanently sealed engagement with the adjoining surface of the pot bottom.

8. The method of manufacturing utensils of the character disclosed, comprising securing a heat collecting plate in solid flat engagement with a pot bottom, reducing the edge of the plate toward the pot bottom to a tapered flange and then spinning said tapered flange into permanent closely sealed engagement with the adjoining surface of the pot bottom.

ANTHONY PERON.